United States Patent

Moldenhauer

[11] Patent Number: 5,899,224
[45] Date of Patent: May 4, 1999

[54] FLOW CONTROLS

[75] Inventor: Hermann Moldenhauer, Düsseldorf, Germany

[73] Assignee: Firma A.U.K. Muller GmbH & Co., Dusseldorf, Germany

[21] Appl. No.: 08/946,281

[22] Filed: Oct. 7, 1997

[30] Foreign Application Priority Data

Sep. 9, 1997 [DE] Germany .................. 196 41 233

[51] Int. Cl.$^6$ .................................................. F16K 15/00
[52] U.S. Cl. .................. 137/517; 137/513.3; 137/854
[58] Field of Search ................... 137/517, 854, 137/521, 843, 513.3

[56] References Cited

U.S. PATENT DOCUMENTS

| 530,442 | 12/1894 | Munger | 137/854 |
|---|---|---|---|
| 1,154,962 | 9/1915 | Bayles | 137/517 |
| 2,674,262 | 4/1954 | Bradshaw | 137/517 |
| 2,777,464 | 1/1957 | Mosley | 137/517 |
| 2,801,067 | 7/1957 | Mercier | 137/517 |
| 2,880,758 | 4/1959 | Mercier | 137/517 |
| 2,939,487 | 6/1960 | Fraser et al. | 137/517 |
| 2,948,296 | 8/1960 | Thorburn | 137/517 |
| 3,228,418 | 1/1966 | Rosback et al. | 137/854 |
| 3,473,561 | 10/1969 | Svenson et al. | 137/854 |
| 3,911,949 | 10/1975 | Hilden et al. | 137/854 |
| 4,325,366 | 4/1982 | Tabor | 137/517 |
| 4,708,166 | 11/1987 | Kobold | 137/517 |
| 4,805,661 | 2/1989 | Knapp et al. | 137/854 |
| 5,226,446 | 7/1993 | Cooper | 137/517 |
| 5,507,318 | 4/1996 | Israelson | 137/854 |

*Primary Examiner*—Henry Bennett
*Assistant Examiner*—Joanne Y. Kim
*Attorney, Agent, or Firm*—Sprung Kramer Schaefer & Briscoe

[57] ABSTRACT

Flow controls that can be inserted in a liquid-supply line or in the accommodating bore of a plumbing fitting. The controls have an essentially cup-shaped mount with perforations through its bottom and a disk of resilient material fits into the perforations. At least the edge of the side of the disk facing the bottom of the cup has a conical bevel of 1° to 5° to the midplane of the disk and narrow ribs and/or sector-shaped webs that extend out essential radially at a prescribed angle around a prescribed circumferential angle.

6 Claims, 3 Drawing Sheets

FLOW CONTROLS

BACKGROUND OF THE INVENTION

The present invention concerns flow controls. They can be inserted in a liquid-supply line or in the accommodating bore of a plumbing fitting. They have an essentially cup-shaped mount with perforations through its bottom. A disk of resilient material fits into the perforations.

Flow controls of this type are preferably employed in the fittings and other components of drinking fountains and are in themselves known. When subjected to pressure by a fluid, the resilient disk constricts the perforations such that the volume of flow remains constant over a specified range of pressure differences.

The resulting volumetric flow and its constancy subject to different pressures extensively depends on the shape and dimensions of the resilient disk. Since resilient materials have wide tolerances in such conditions, the ideal volumetric flow cannot be attained and will not remain constant over extensive ranges of pressure difference.

The initial slope of the controls' characteristic curve depends in particular on the shape of the disk. That shape determines at what minimal pressure difference the controls will attain their rated value. Conventional controls often have a slope that is not as steep as desired and only arrive at their nominal volumetric flow at greater pressure differences.

It has also often been observed that flow controls react dynamically to changes in pressure difference rather slowly, exhibiting considerably hysteresis in response to alternately increasing and decreasing pressure. Furthermore, lasting deformations sometimes occur in the disk and will lead over time to alterations in the characteristic curve.

SUMMARY OF THE INVENTION

The object of the present invention is to improve flow controls of the type described above to the extent that volumetric flow will remain relatively constant over extended ranges of pressure difference, that the initial slope of the controls' characteristic curve will be steep, that their hysteresis will be low even though the pressure increases and decreases, and that the characteristic curve will be very stable throughout their operation.

This object is attained in accordance with the present invention in that at least the edge of the side of the disk facing the bottom of the cup has a conical bevel of 1° to 5° to the midplane of the disk and narrow ribs and/or sector-shaped webs that extend out essential radially at a prescribed angle around a prescribed circumferential angle. It has been demonstrated to be of advantage for the bottom of the cup to have n>3 perforations symmetric to the axis and a central post with a polygonal cross-section with no more than n−1 sides, and for the disk to have a matching hole at the center that fits over the post. When there are six perforations through the bottom of the cup, it is also of advantage for the hole at the center of the disk and the post at the center of the bottom to be pentagonal in cross-section. The upstream side of the disk, the side that faces away from the bottom of the cup, can be a truncated cone. The cup-shaped mount can also have a concentric bypass bored through it. The mount can also communicate with a diffuser in the form of a disk with several spokes extending radially out from its center, whereby the downstream end of the bypass can be a specified distance from the spokes.

The conical bevel in the side of the disk facing the mount ensures a steep initial slope in the controls' characteristic curve. The narrow ribs and/or sector-shaped webs on that side contribute to low hysteresis and rapid response.

A "narrow rib" in the context of the present invention is a rib with a width that is only a fraction of the diameter of the disk. A "sector-shaped" web is to be understood as a somewhat wider area that extends around a circumferential angle of the disk that can be more than 90°. These relationships will be specified hereinafter with reference to the illustrated embodiment.

One embodiment of the present invention and how it works will now be specified with reference to the accompanying drawing, wherein

DETAILED DESCRIPTION OF THE INVENTION

Figure 1:
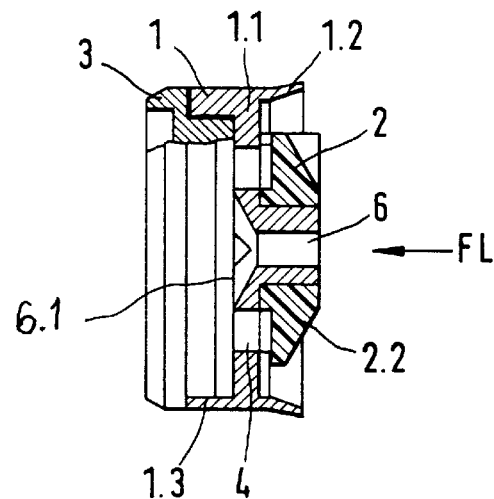
FIG. 1 is a longitudinal section through flow controls.
Figure 2:
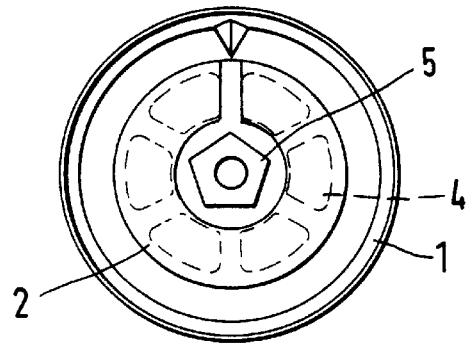
FIG. 2 is a front view of the controls illustrated in FIG. 1.
Figure 3:
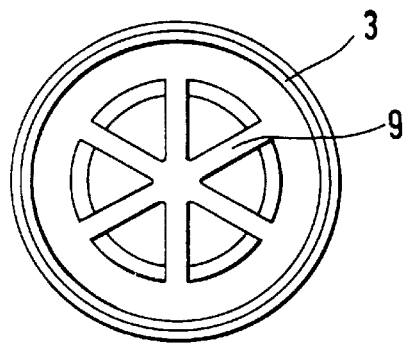
FIG. 3 is a rear view of the controls illustrated in FIG. 1.

Referring to FIGS. 1–3, the flow controls illustrated in the drawing basically comprise three parts: a mount 1, a disk 2, and a diffuser 3. The mount 1 in the illustrated embodiment is essentially cup-shaped toward each side and has a bottom 1.1, one wall 1.2 extending forward, and another wall 1.3 extending backward. Forward-extending wall 1.2 is elastic and spreads out like a funnel. The bottom 1.1 of mount 1 is perforated by perforations 4 distributed symmetrically around its axis. There are six perforations 4 for example in the illustrated embodiment. There is a pentagonal post 5 at the center of the front of the bottom 1.1 of mount 1. A bore 6 extends through the center of post 5.

Figure 4:
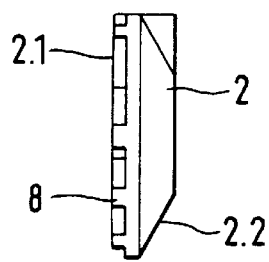
FIG. 4 is a side view of the disk employed in the controls illustrated in FIGS. 1 through 3.
Figure 4A:
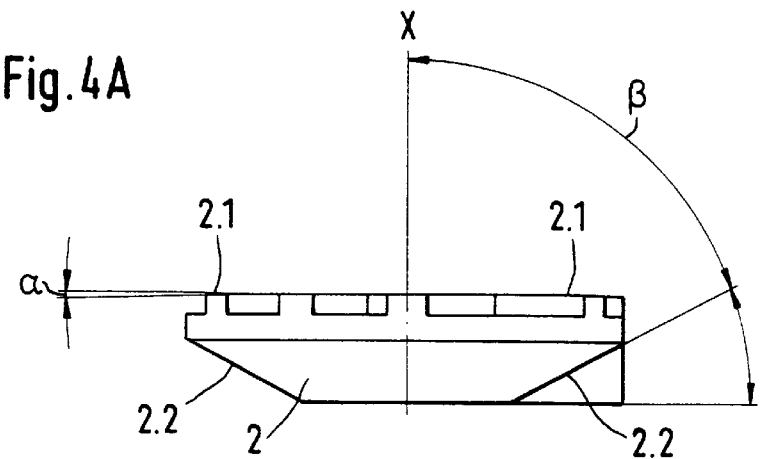
FIG. 4A is a larger-scale view of the disk illustrated in FIG. 4.
Figure 5:
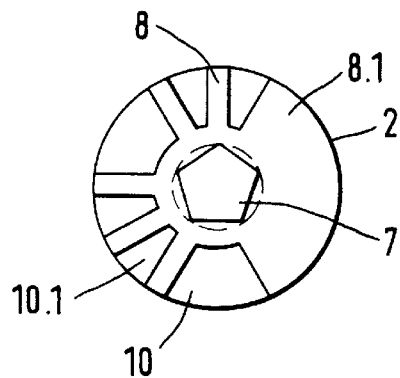
FIG. 5 illustrates the back of one embodiment of the disk.

One embodiment of the disk 2 employed in mount 1 is illustrated in FIGS. 4, 4A, and 5. A matching pentagonal hole 7 in the center of disk 2 fits over the pentagonal post 5 at the center of the bottom 1.1 of mount 1.

Disk 2 is made of a resilient material, an elastomer for example. There is steeply sloping conical bevel 2.2 around the front, the upstream side, that is, of disk 2. Conical bevel 2.2 slopes at a prescribed angle $\beta$ to the axis x of the disk. The resulting reduction in volume allows the disk to respond to even slight changes in pressure. Around the back of disk 2 is a shallower conical bevel, sloping at a prescribed angle $\alpha$ of 1 to 5°. Also on the rear of the disk are, as will be evident from FIG. 5, narrow ribs 8. Ribs 8 extend out essentially radially at a prescribed angle. The width of each rib is only a fraction of the circumference or diameter of the disk. Between each pair of ribs is a depression 10. The embodiment illustrated in FIG. 5 also features a sector-shaped web 8.1 that extends around part of its circumference at a specified angle of more than 90°. The expanding sections of the divided back of the installed disk 2 will rest more and more against the bottom 1.1 of mount 1, closing off perforations 4. The controls' rated volumetric flow will depend on the number of ribs 8, on the space between them, and on the structure and extant of sector-shaped web 8.1. The slight bevel 2.1 on the back of disk 2 will promote a steep slope on the part of the volumetric-flow characteristic curve and low hysteresis during fluctuations in pressure. The specified shape of disk 2 allows greater hardness tolerances.

Figure 6:
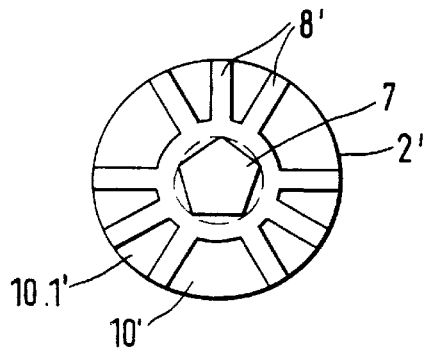
FIG. 6 is an illustration similar to FIG. 5 of the back of another embodiment of the disk.

FIG. 6 illustrates a slightly different disk 2' with only narrow radial ribs 8' at different angular separations and with depressions 10' and 10.1' between them on the back. Other shapes and distributions of the ribs and webs are of course also possible.

The five possible defined positions of disk 2 in relation to the six perforations 4 in the bottom 1.1 of mount 1 makes it possible to vary the controls' rated volumetric flow without having to replace the parts.

Post 5 can of course be square instead of pentagonal, in which event there would be five perforations 4 in the bottom 1.1 of mount 1, and disk 2 could be positioned in mount 1 in one of four positions, each resulting in a different behavior.

Generally, and to particular advantage, the bottom will have n perforations distributed symmetric to its axis and the post and hole n−1 sides, allowing an equal number of different positions and behaviors. The number n will be a natural number higher than 3 and, practically, lower than 10.

The diffuser 3 fits into a bore on the back of mount 1. Diffuser 3 is a rotationally symmetric component and features spokes 9 that extend equally distributed out of its center. It shapes the jet of liquid leaving the controls. Diffuser 3 simultaneously acts as an impedance to the medium leaving the mount. Spokes 9 are designed and distributed to leave a prescribed distance between the upstream and open end 6.1 of the bypass bore and the spokes. The medium will accordingly distribute itself uniformly between disk 2 and diffuser 3 and will leave the controls in a specific direction through the spaces between spokes 9.

How the controls functions will now be described.

The flow controls are inserted into matching accommodations in fittings, safety devices, and jet regulators or sections of pipeline, with the funnel-shaped extension in forward-extending wall 1.2 resting tight against the accommodation.

Figure 7:
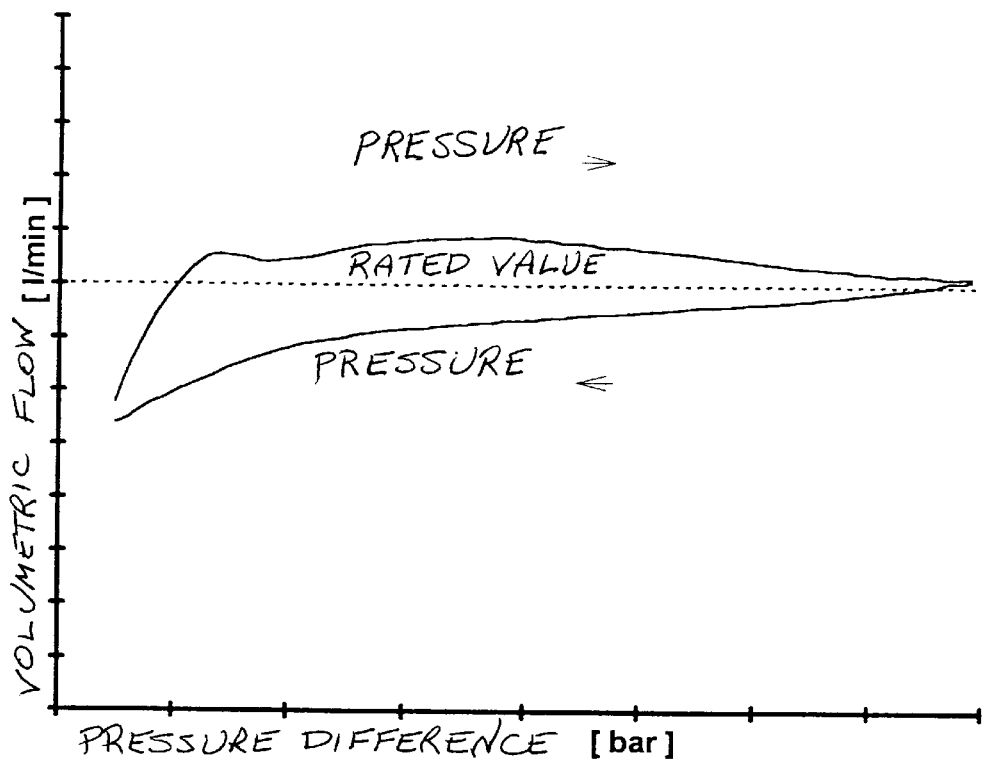
FIG. 7 is a graph of the characteristic curve of flow controls at the state of the art.

The pressure exerted by the medium as it flows in direction FL (FIG. 1) impacts disk 2 such that the narrow ribs 8 or sector-shaped web 8.1 and the remaining areas on the back of the disk gradually come to rest against the bottom 1.1 of mount 1, partly closing off perforations 4, the remainder of which determine, in conjunction with the mount's bypass bore 6, the volumetric flow. As the pressure difference continues to increase, the depressions 10 between the ribs 8 on disk 2 are also forced into the openings, decreasing the volumetric flow and resulting in a straight characteristic curve. The volumetric flow will accordingly remain constant, independent of the pressure difference. As the pressure difference decreases, the resilient disk will release more and more cross-section, automatically approaching the volumetric flow to nominal. The medium will accordingly flow through diffuser 3 and leave the controls in a uniform jet. FIG. 7 illustrates a volumetric-flow characteristic curve in conventional state-of-the-art controls. It will be evident that these controls exhibit a very definite hysteresis, with the rated value rapidly being exceeded and then dropping again as the pressure increases and immediately falling short as the pressure decreases.

Figure 8:
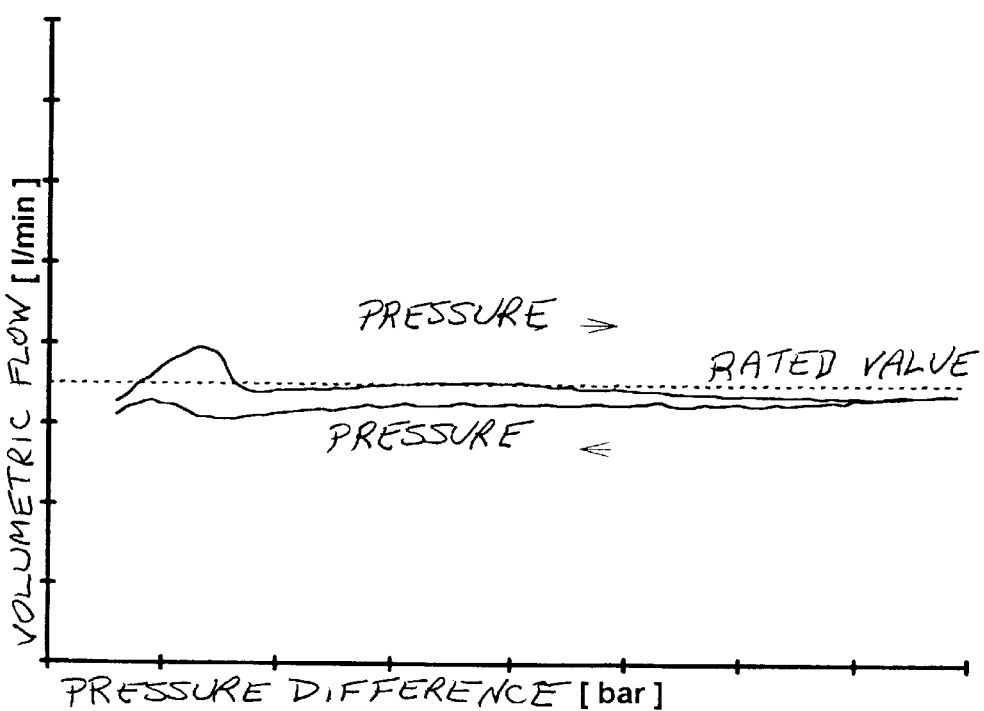
FIG. 8 is a graph of the characteristic curve of flow controls in accordance with the present invention.

FIG. 8 illustrates a volumetric-flow characteristic curve for controls with the features hereintofore specified. As will be evident from the graph, the rated value is maintained much more effectively as the pressure increases and decreases, and the hysteresis is very slight.

What is claimed is:

1. A flow control insertable into a liquid-supply line or in a bore of a plumbing fitting, comprising: an essentially cup-shaped mount having a bottom with perforations therethrough; a disk of resilient material having one side facing the perforations and another side facing a flow of liquid, wherein the one side of the disk has at least an edge portion facing the bottom of the cup-shaped mount and having a conical bevel of 1° to 5° towards a center of the disk and at least one of narrow ribs and sector-shaped webs that extend essentially radially outwardly at angular spacings and have a specified circumferential angle, whereby the movement of the beveled edge portion of the resilient disk towards and away from the perforations in the bottom of the mount in response to changes in liquid pressure effects a flow control.

2. The flow control as in claim 1, wherein the bottom of the cup-shaped mount has n>3 perforations symmetric to a central axis and a central post with a polygonal cross-section with no more than n−1 sides, and wherein the disk has a matching polygonal hole at the center thereof that fits over the post.

3. The flow control as in claim 1, wherein there are six perforations through the bottom of the cup-shaped mount, and wherein the hole at the center of the disk and the post at the center of the bottom are pentagonal in cross-section.

4. The flow control as in claim 1, wherein said another side of the disk is a truncated cone.

5. The flow control as in claim 1, wherein the cup-shaped mount has a concentric bypass bored therethrough.

6. the flow control as in claim 5, further comprising a diffuser in communication with a downstream side of the mount and comprising a disk with a plurality of spokes extending radially outwardly from a center thereof and wherein a downstream and of the bypass is a specified distance from the spokes.

* * * * *